NON-WOVEN
FABRIC SUBSTRATE
IMPREGNATED
WITH RUBBERY
POLYMER

Fig. 1

EMBOSSING
PLATE COATED
WITH PARTIALLY
CURED POLYURETHANE
RUBBER CONTAINING
VOLATILE SOLVENT

Fig. 2

SUBSTRATE
COATED WITH
UNCURED POLYURETHANE
RUBBER CONTAINING
VOLATILE SOLVENT

Fig. 3

SUBSTRATE
SUPERIMPOSED ON
EMBOSSING PLATE
AND ENCLOSED
WITH SHIMS AND
COVER PLATE

Fig. 4

POLYURETHANE
LAYERS CURED
TOGETHER AND
EXPANDED TO
MICROPOROUS
CONDITION

Fig. 5

FINISHED
LEATHER-LIKE
MATERIAL

Fig. 6

INVENTOR.
IRA D. DOBBS
BY James J. Long

AGENT

United States Patent Office 3,255,061
Patented June 7, 1966

3,255,061
PROCESS FOR MAKING SYNTHETIC
LEATHER-LIKE MATERIAL
Ira D. Dobbs, Allendale, N.J., assignor to United States
Rubber Company, New York, N.Y., a corporation of
New Jersey
Filed Apr. 20, 1962, Ser. No. 189,085
5 Claims. (Cl. 156—79)

The literature (e.g. U.S. Patents 3,000,757, Johnston et al., September 19, 1961; 2,973,284, Semegen, February 28, 1961) contains many descriptions of synthetic, leather-like materials and processes for their preparation. While many of these have one or more desirable properties which are equal or even superior to the same properties in a natural leather, the achievement of a synthetic leather having all the desirable properties to the same or higher degree as those of natural leathers is most difficult. Whereas certain synthetic plastic materials are tough and scuff resistant, they are not at the same time permeable to water vapor and they do not have the hand or appearance of finished leather.

I have developed a synthetic leather having all these desirable characteristics. I do this by coating a porous, preferably non-woven fabric or mat of a natural or synthetic fibrous material, such as nylon, Orlon, Dacron, rayon, cotton, felts of animal hair, wool and the like with a polyurethane plastic in a certain manner and blowing and curing the polyurethane in a certain manner.

The following detailed description of the invention may be followed while referring to the accompanying self-explanatory drawing, wherein:

FIG. 1 is a purely diagrammatic fragmentary sectional view of a piece of non-woven fabric with a rubbery polymer dispersed on and in the fabric;

FIG. 2 is a similar view of an embossing plate with an uncured polyurethane rubber layer thereon;

FIG. 3 is a similar view of the impregnated substrate of FIG. 1 with a polyurethane rubber coating thereon;

FIG. 4 is a similar view of an assembly of embossing plate, substrate, cover plate and shims as initially brought together;

FIG. 5 is a similar view of the assembly of FIG. 4 after a blowing and curing operation; and FIG. 6 is a similar view of the final leather-like product after removal of the plates and shims.

In the practice of my invention I first coat and impregnate a porous, fibrous, non-woven fabric with a rubbery high polymer composition in a flowable state, usually a substantially liquid state such as a rubber latex or dispersion, or a solution of a rubbery polymer or a plastisol, organisol or the like. Among the rubbery high polymer compositions which may be employed may be mentioned polyvinyl chloride plastisol, polyvinyl chloride organisol, polyurethane (inherently liquid polyurethane or a solution of a polyurethane, usually a reaction product of a polyhydroxy-terminated polymer [polyester, polyether, or the like] with an organic diisocyanate, as disclosed for example in U.S. Patent 3,004,939, Varvaro, October 17, 1961, and the references cited therein), rubbery copolymers of 1,3-butadiene and acrylonitrile, and combinations of rubbery copolymers of 1,3-butadiene and acrylonitrile with polyvinyl alcohol. After suitable removal, if necessary (e.g. by means of squeeze rollers) of any excess liquid rubbery composition, the composition is solidified, that is, water or solvent if present is driven off by heat and/or the composition is hardened (cured or gelled or fused) by heat. For example, polyvinyl chloride plastisol requires heat alone to cause it to become rubbery solid (it does not contain water or solvent). Polyvinyl chloride organisol contains organic solvents which are volatilized by heat. The liquid polyurethane can be compounded with a curative such as 3,3'-dichloro-4,4'-biphenyldiamine to cause it to be cured to a solid state by heat. Latex, such as that of a copolymer of 1,3-butadiene and acrylonitrile, contains water which is driven off by heat to leave a solid deposit and usually further includes sulfur and accelerators which bring about curing when heated. The term "solidifying" therefore includes curing and/or "drying," and the latter includes removal of water or solvent. As a result, there is retained evenly dispersed in and on the non-woven fabric, an amount of the rubbery high polymer equal to from 50% to 500% by weight of the uncoated fabric. In the drying step mentioned above, it is not necessary that the coating be made entirely free of solvent at this stage. Depending upon the subsequent application, the coated substrate may or may not now be pressed to ensure a smooth surface. FIG. 1 of the drawing represents such a coated, impregnated, non-woven fabric substrate.

The choice of the substrate, its thickness, and the number of plies for a given thickness, and the percent pick-up of polymer are factors influencing the hand of the finished leather and can be varied as illustrated below.

Next, I coat the surface of a metal embossing plate with a polyurethane polymer. The embossing plate is a metal plate on whose surface a design has been engraved or electroplated. For example, the surface of this plate can be a replica of the surface of a calf skin. The coating of the embossing plate is done by spraying a polyurethane prepolymer composition in solution in a suitable solvent onto the engraved or otherwise decorated surface of metal plate, preheated to 220° to 250° F., and thereafter the coated plate is further heated to remove a part of the solvent. The choice of solvent and the time and temperature of the heating period largely determine the uniformity of distribution of the pores and the pore size of a given polyurethane coating. If the coating is heated too long or at too high a temperature, all the solvent needed later to produce the pores will be removed and pores cannot be formed. If heated at too high a temperature, too great a degree of curing will occur and the coating cannot be subsequently laminated to the substrate. On the other hand if the coating is not heated enough, it will be in too fluent a condition to remain as a distinct layer having the desired thickness in the subsequent laminating step, and/or the pores will be too large and unevenly distributed. In general the heating is adjusted to remove part of the solvent and to produce a very slightly cured and unblown film which is of a viscosity suitable for applying to the surface of the substrate, and which is adhesive to such surface. When heated and partially cured to the proper extent, the coating on the embossing plate is essentially solid but weak, soft and somewhat tacky, as distinguished from the essentially liquid condition of the uncured polyurethane prepolymer on the one hand, and the firm, strong, non-tacky, elastomeric condition of the substantially fully cured polyurethane on the other hand.

The solvent or solvent combination must be anhydrous. Water is deleterious because it causes pores to form that are too large. Dry acetone, dry toluene and preferably combinations of the two are effective. Cyclohexanone may be used in place of acetone. Preferably the boiling point of the solvent or mixture of solvents is about 230° F. or less. The pore size can be controlled by choice of solvent. Generally, one must use a solvent, or a mixture of solvents, in which the polyurethane is soluble and which can be removed by heating within a feasible temperature range. A convenient and feasible temperature range for this step is from about 220° F. to 250° F. The coating usually is prepared by application of 2, and as many as 8, sprayings in order to obtain the desired thickness, i.e., about .003″ to .005″.

After each spraying the plate is heated for a time and temperature designed to give a film of the characteristics described above, usually at about 220°–250° F. for 1 to 2 minutes. Such a coated plate is represented in FIG. 2.

Polyurethanes suitable are well known in the art. They are described, in principle, by Muller, in Rubber Chem. & Tech., 26, 493 (1953).

A typical spraying formula is:

| Materials: | Parts by weight |
|---|---|
| Polyurethane | 100 |
| Dichlorobenzidine | 7 |
| Pigment (optional) | 6–10 |
| Acetone | 21 |
| Toluene | 83 |

The above described impregnated but porous substrate is now freshly coated, as by spraying, with a solution of the polyurethane in such a manner that the fibers of the surface of the substrate are coated with the polyurethane polymer without filling the interstices (as represented in FIG. 3), and while this polyurethane coating is still in a wet, uncured condition it is placed in contact with the polyurethane-coated surface of the metal embossing plate. The uncured, moist polyurethane coating on the substrate fibers serves to adhere the substrate to the polyurethane coating on the embossing plate. It is understood that the polyurethane coating on the embossing plate is at this time in an unblown and only slightly cured condition. As shown in FIG. 4, the assembly is placed against a cover plate separated from the embossing plate by metal shims which are not quite as thick as the total thickness of the coated substrate plus the coating on the embossing plate, so that the assembly is slightly compressed between the rigid, unyielding cover plate and the rigid, unyielding embossing plate, with the aid of a suitable conventional hydraulic press or the like. The thickness of the shims is chosen so as to give a well shaped and integrally adhered final product of good hand and free of stiffness and boardiness. The thickness will vary depending upon the thickness of the polyurethane coating and the thickness of the substrate used. To duplicate natural calfskin the shims are set to give a thickness of about .050 inch (which is somewhat less than the sum of the thickness of the coated substrate plus the thickness of the coating on the embossing plate). In general one will, for good results, apply a coating of a thickness of about 0.006 to 0.010 inch to the embossing plate regardless of the thickness of the substrate. Although a thicker coating on the plate could be used, no added improvement would result and it would be more expensive.

As indicated, lamination is accomplished by placing the slightly cured coated surface of the embossing plate and the moist, uncured coated surface of the substrate in uniform and firm contact with each other, enclosing with the shims and cover plate as described, and then heating the assembly to curing temperature, e.g., 300° F., for a sufficient time, e.g., 10 minutes, so that the material is cured to a solid, strong, elastomeric state. The polyurethane coating on the embossing plate and the polyurethane coating on the substrate become integrally united into a single layer attached to the fabric substrate during this curing step and at the same time the coating also becomes microporous, as a result of volatilization of the solvent contained in the coating. Such volatilization causes an expansion or blowing of the coating, as shown in FIG. 5.

The final product has the appearance and hand of finished leather. It is more porous than leather and has greater air permeability than leather. It is permeable to water vapor. It has greater abrasion resistance than natural leather.

The invention is further illustrated, but not limited, by the following example.

One mole of a poly(ethylenepropylene adipate) having a mole ratio of 70 ethylene/30 propylene, a mole weight of about 2,000 and terminating in hydroxyl groups, is mixed with 2 moles of 4,4′-methylenediphenyl diisocyanate and heated for 1 hour at 100° C. to obtain a fluid polyurethane prepolymer. The prepolymer is an uncured, soluble, isocyanate-terminated material. This polymer is made into a solution of the following composition:

| Materials: | Parts by weight |
|---|---|
| Above fluid polyurethane prepolymer | 100 |
| 3,3′-dichloro-4,4′-biphenyldiamine | 7 |
| Pigment composition [1] | 6 |
| Acetone | 127 |

[1] E.g. Claremont Dispersion 4,000 DPB–1.

A piece of a commercially available non-woven nylon fabric (Pellon 979–W) is dipped into the above solution, then squeezed between steel rolls set 0.035 inch apart and running at 6 feet per minute, and thereafter dried for five minutes at 200° F. The pick-up is 302%.

This impregnated nylon substrate is then pressed smooth to 0.050 inch for 5 minutes at 300° F., with 0.050 inch shims. The polyurethane prepolymer thus becomes cured (by the cross-linking action of the 3,3′-dichloro-4,4′-biphenyldiamine on the isocyanate groups of the prepolymer) to a solid state within the nylon substrate, which still remains porous however.

The following polyurethane prepolymer solution is prepared:

| Materials: | Parts by weight |
|---|---|
| Above-described fluid polyurethane prepolymer | 100 |
| 3,3′-dichloro-4,4′-diaminobiphenyl | 7 |
| Pigment composition | 6 |
| Acetone (anhydrous) | 28 |
| Toluene (anhydrous) | 83 |

One side of the impregnated nylon substrate sample is now sprayed with a sufficient amount of this solution so as to deposit a surface coating which will be equivalent to 4 grams per sq. ft. at dry weight.

A suitable steel embossing plate is heated to 225° C. in an air-oven, the embossing plate removed from the oven, and, while at this temperature, sprayed very lightly with the above polyurethane solution, then returned to the oven at 225° F. for 1½ minutes, thereafter again removed and sprayed with a heavier coating of the same polyurethane solution, and once again returned to the oven for 1½ minutes. Under these conditions the coating still retains considerable solvent and is only very slightly cured and is non-porous. The coating is solid but still relatively soft. A test shows that when this coating is completely cured and blown the thickness will be about .003″.

The thus coated surface of the embossing plate is now pressed against the sprayed and still tacky surface of the coated nylon substrate. The reverse, non-sprayed side of the substrate is placed on a metal cover plate, and metal shims 0.050 inch thick are so placed between the embossing plate and cover plate as to permit the coated assembly to be cured under slight pressure and thus insure firm shaping of the piece and good adhesion of the polyurethane to the substrate. The thickness of the assembly of substrate and coating on the embossing plate is slightly more than the space provided by the shims, with the result that the laminate is slightly compresssed between the plates as indicated in FIG. 4. During the heating process, the polyurethane expands as explained previously by reason of the vaporization of the solvent contained in the polyurethane. As the polyurethane expands the substrate presses against the rigid, unyielding cover plate while the polyurethane presses against the rigid, unyielding embossing plate, and thus a definite pressure is exerted on the laminate, insuring good adhesion and insuring proper shaping of the laminate in the desired flat form. The assembly is cured for 10 minutes at 300° F. to produce a leather-like product .050 inch thick. The leather-like sample is removed from the cool mold and found to have the appearance and hand of finished leather. If desired the described steps can be carried out continuously. The cured polyurethane rubber is non-adherent to the embossing plate. The polyurethane surface has permanently impressed thereon the surface character of the embossing plate. The polyurethane forms a continuous microporous coating on the porous substrate.

The following properties were observed:

Tensile strength, p.s.i.[1] _____ 1500
Percent elongation at break _____ 125
Stitch tear, lbs.[2] _____ 25
Water vapor permeability, weight loss, grams[3] ____ 0.9

[1] McLaughlin & Theis, "The Chemistry and Manufacture of Leather," Reinhold, New York, New York, 1945, page 768.
[2] Ibid., Method E, page 771.
[3] The value 0.9 represents the loss of water (in grams) through a 10 cm.² sample in one day as measured by the method described by the Fisher Scientific Company in directions which are supplied with the Payne Permeability Cup described in their catalog #13, Item No. 338.

Other conventional polyurethanes may be substituted for those shown in the working examples, particularly those which are isocyanate-terminated polyurethanes made by reacting a substantially linear hydroxy-terminated polyester (i.e., glycol dicarboxylic acid self-condensation product) with an excess of a diisocyanate. Usually the glycol contains from 4 to 20 carbon atoms and the acid contains from 4 to 20 carbon atoms. Among the glycols used may be mentioned ethylene glycol, 1,2-propylene glycol, 1,3-propylene glycol, tetramethylene glycol, 1,2-butylene glycol, 2-butene-1,4-diol, 1,6-hexanediol, 2,2'-thiodiethanol, 2-methyl-1,5-pentylene glycol, and 2-ethyl-1,3-propylene glycol. Among the acids used may be mentioned succinic acid, maleic acid, fumaric acid, methylsuccinic acid, glutaric acid, pimelic acid, suberic acid, azelaic acid, sebacic acid, phthalic acid, and terphthalic acid. Usually such an amount of glycol is used as to give a polyester having a hydroxyl number of 20 to 225 and preferably 36 to 75, and a low acid value less than 6 and preferably less than 1. The molecular weight of the polyester usually ranges from 500 to 5000 and preferably from 1500 to 3000. In general the most suitable polyesters are chiefly linear in type with melting point levels of 90° C. or lower. To make the prepolymer the polyester is reacted with an organic isocyanate, whether an aliphatic diisocyanate such as 1,6-hexamethylene diisocyanate, 1,4-tetramethylene diisocyanate, 1,10-decamethylene diisocyanate, 1,4-cyclohexylene diisocyanate, and 4,4'-methylenebis(cyclohexylisocyanate), or an aromatic diisocyanate such as metaphenylene diisocyanate, metaxylylene diisocyanate, p-phenylene diisocyanate, p,p'-biphenyl diisocyanate, 1,5-naphthalene diisocyanate, 2,4-toluene diisocyanate, and p,p'diphenylmethane diisocyanate. Usually about 1.5 to 5 moles of diisocyanate are used for each mole of polyester. Such a polyurethane "prepolymer" as used in the invention is a soluble, uncured material (usually a liquid), but is capable of being cured or converted to a solid, insoluble, cross-linked, elastomeric state by the action of conventional bifunctional curing agents. For purposes of the invention such conventional curing agents include amines such as p,p'-diaminodiphenylmethane, p-phenylenediamine, tetramethylenediamine, 1,6-hexamethylenediamine and 3,3'-dichloro-4,4'-biphenyldiamine, aminoalcohols such as ethanolamine, and p-aminobenzyl alcohol, and polyhydric alcohols such as glycerol, trimethylolpropane and 1,4-butanediol. Such curing agent is of course mixed with the polyurethane prepolymer and solvent to make the spray solution described above. Although water is a conventional curing agent for polyurethanes it cannot be used as the curing agent in this invention because carbon dioxide gas is a by-product of the curing reaction with water. Such gas leads to the formation of coarse pores and produces a material which does not have the presently desired characteristics. Depending on such variables as the particular polyurethane prepolymer employed, the amount and kind of curing agent, the kind of heating device employed, the thickness of the embossing plate and cover plate, and other factors, the polyurethane can be cured over a wide range of time-temperature combinations (e.g., 3 minutes or less to 1 hour or more at about 250°–350° F.), the time and temperature being generally inversely related.

Having thus described my invention, what I claim and desire to protect by Letters Patent is:

1. A method of making synthetic leather comprising impregnating a porous, fibrous, non-woven fabric, without filling the interstices, with a liquid, rubbery high polymer composition in an amount equal to from 50% to 500% of said polymer by weight of the fabric to provide a porous substrate, the said polymer composition comprising an uncured isocyanate-terminated polyurethane and a curative therefor, heating the impregnated substrate to cure the polyurethane prepolymer to a solid, elastomeric state in the substrate, coating an embossing plate with an anhydrous solution comprising a solvent, uncured isocyanate terminated polyurethane prepolymer, and a curing agent therefor, removing only a part of the solvent by heating the coating on said plate from 1 to 3 minutes at 220°–250° F. to provide a partially cured, unblown film still containing solvent, applying a further fresh coating of said polyurethane prepolymer solution to the surface fibers of the porous substrate without filling the interstices thereof, placing said freshly coated surface of the still porous substrate against the polyurethane coating on said plate, compressing the assembly against an unyielding surface, heating the assembly to volatilize the solvent remaining in the polyurethane coating on the embossing plate and to thereby expand said coating to a microporous condition while so compressed, the polyurethane thus assuming a microporous condition the said last-mentioned heating step at the same time serving to cure the said further fresh coating of polyurethane on the said surface fibers and serving to complete the cure of the previously partially cured polyurethane film on the embossing plate, whereby the resulting leather-like assembly is provided with a microporous cured polyurethane surface film bearing the imprint of said embossing plate and firmly adhered to the polyurethane impregnated porous fibrous base through the medium of said further fresh coating of polyurethane.

2. A method as in claim 1 in which the said polyurethane is a reaction product of an hydroxy-terminated polyester with an organic diisocyanate.

3. A method as in claim 1 in which the said curing agent is an organic diamine.

4. A method as in claim 1 in which the said solvent is selected from the group consisting of acetone, toluene, cyclohexanone, and mixtures thereof.

5. A method as in claim 1 in which the said solvent is a mixture of acetone and toluene.

References Cited by the Examiner

UNITED STATES PATENTS

| | | |
|---|---|---|
| 2,723,935 | 11/1955 | Rodman. |
| 2,751,775 | 6/1956 | Sergovic. |
| 2,817,619 | 12/1957 | Bicket et al. |
| 2,850,890 | 9/1958 | Rubenstein. |
| 2,894,855 | 7/1959 | Wilhelm et al. |
| 2,924,800 | 3/1960 | Hill. |
| 2,994,617 | 8/1961 | Proctor. |
| 3,100,721 | 8/1963 | Holden _____ 117—135.5 |
| 3,193,435 | 7/1965 | Schafer _____ 161—40 |
| 3,196,062 | 7/1965 | Kristal _____ 156—79 |

EARL M. BERGERT, *Primary Examiner.*

R. I. SMITH, M. L. KATZ, *Assistant Examiners.*